Dec. 5, 1944.   B. A. SWENNES   2,364,327
MOTOR DRIVEN VEHICLE
Filed Oct. 10, 1942   3 Sheets-Sheet 1
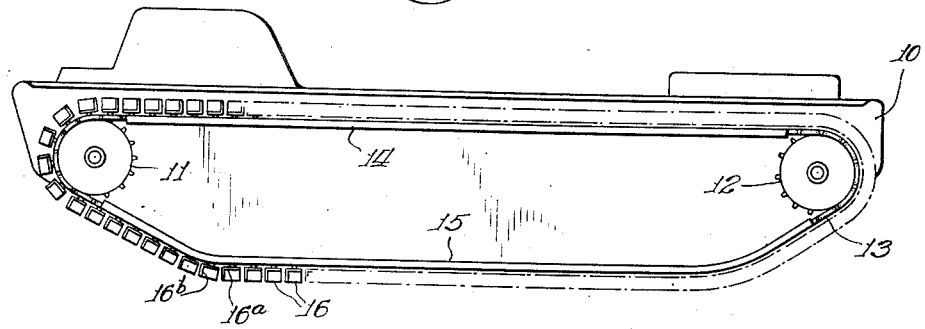
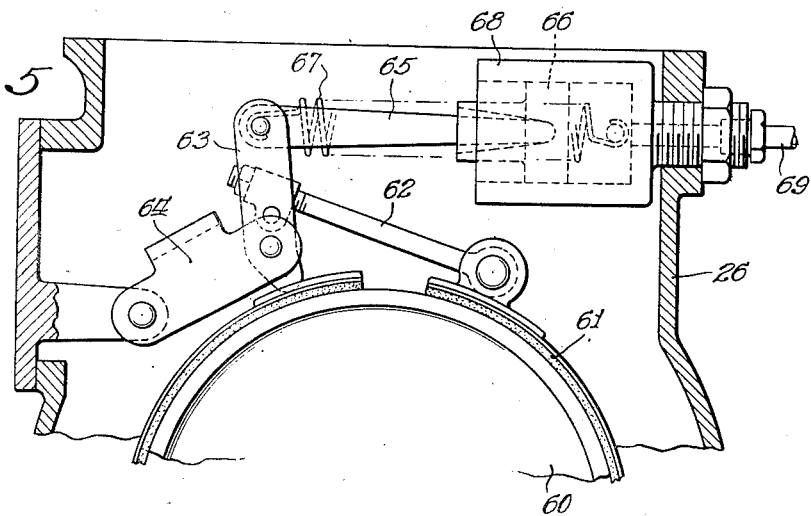
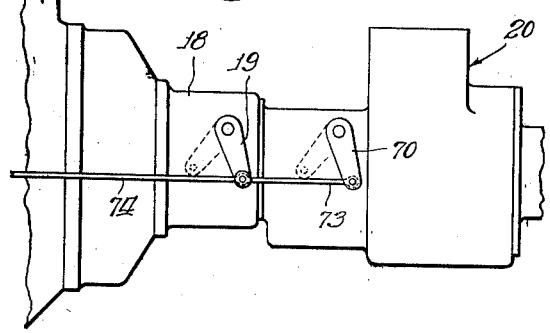
Inventor:
Benjamin A. Swennes
By: Edward C. Gritzbaugh
Atty.

Dec. 5, 1944.  B. A. SWENNES  2,364,327
MOTOR DRIVEN VEHICLE
Filed Oct. 10, 1942  3 Sheets-Sheet 2
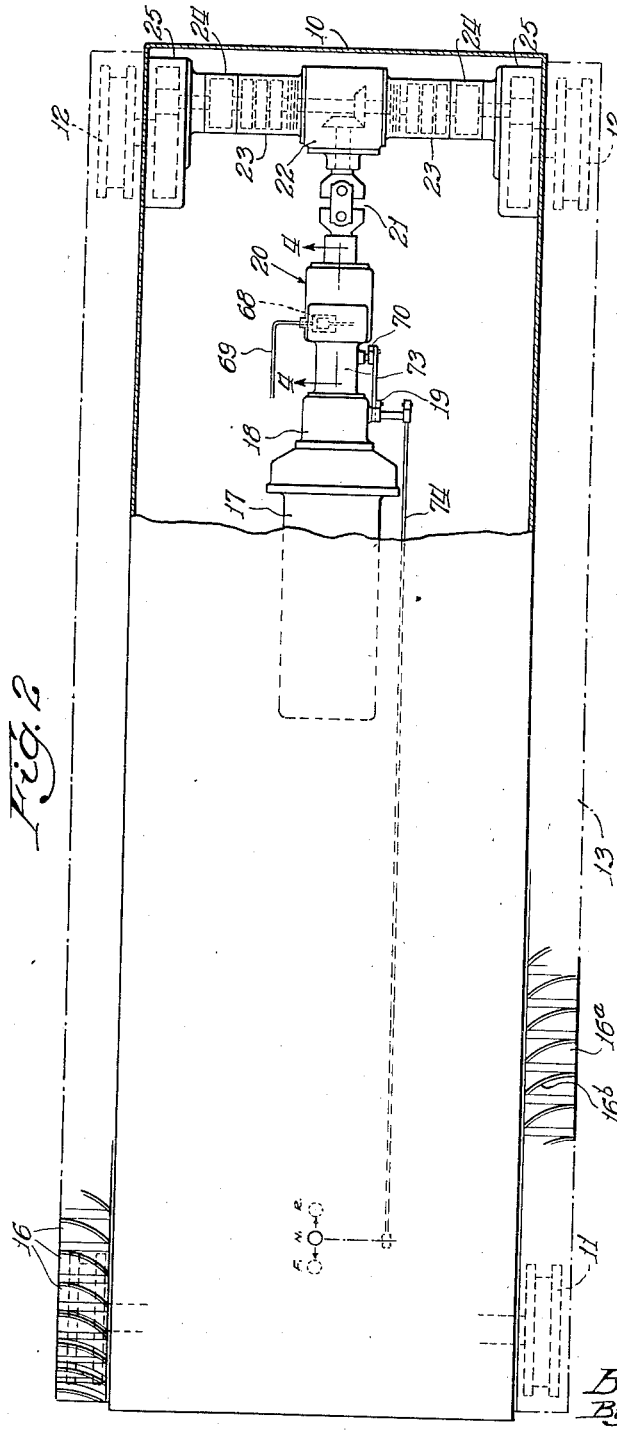
Inventor:
Benjamin A. Swennes
By: Edward C. Fitzhugh
Atty.

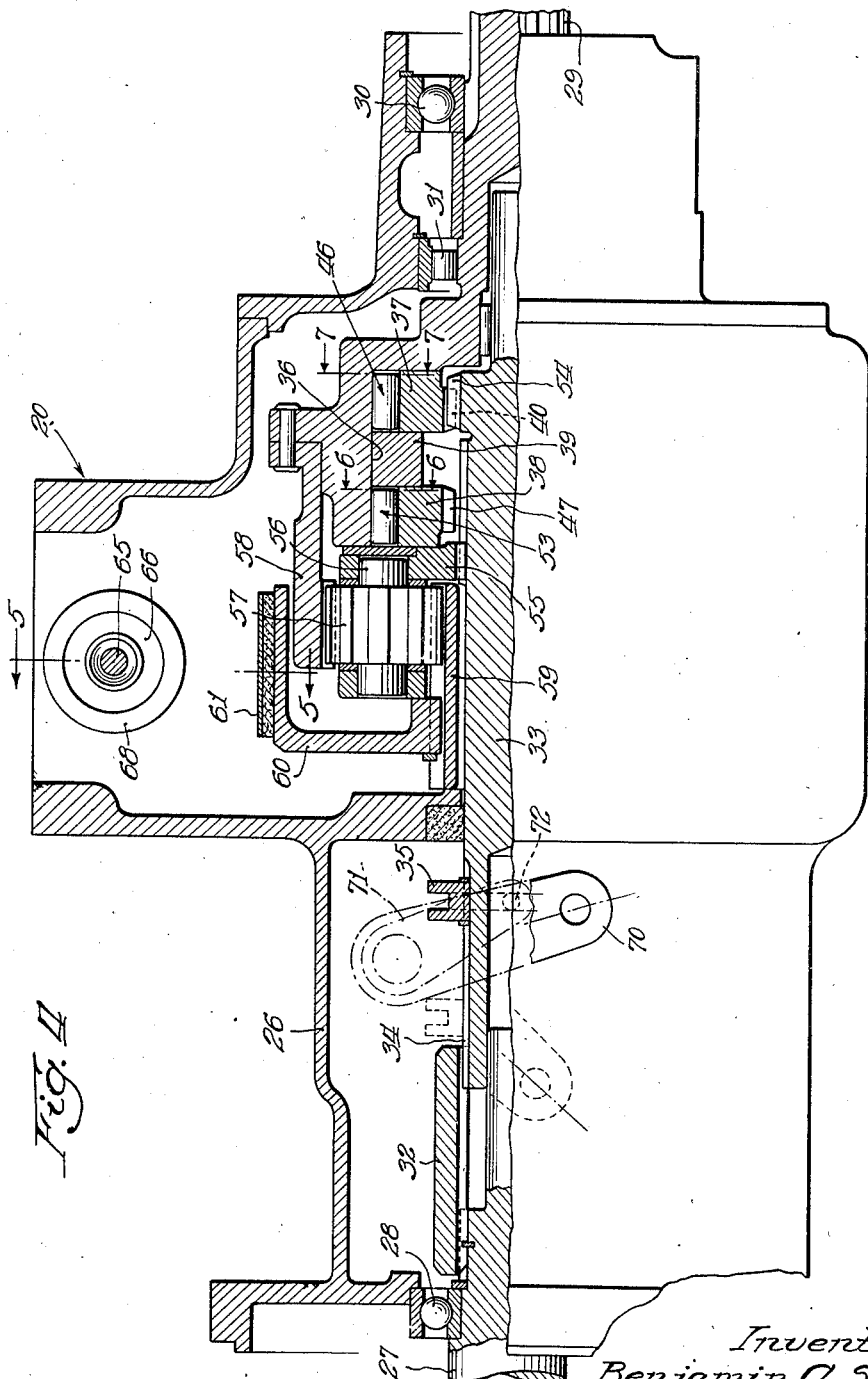

Patented Dec. 5, 1944

2,364,327

UNITED STATES PATENT OFFICE 2,364,327

MOTOR DRIVEN VEHICLE

Benjamin A. Swennes, Rockford, Ill., assignor to Borg-Warner Corporation, Chicago, Ill., a corporation of Illinois Application October 10, 1942, Serial No. 461,623

6 Claims. (Cl. 115—1)

My invention relates to automotive or motor driven vehicles and more particularly to such vehicles which may be propelled with respect to a plurality of different reaction media, such as land and water.

Automotive vehicles which may be driven with respect to a plurality of different reaction media have heretofore been used. The patent to Roebling, No. 2,138,207, issued November 29, 1938, shows one form of such an automotive vehicle. As shown in this patent, such a vehicle is commonly provided with two movable treads on opposite sides of the vehicle with the treads being so constructed that when they are in motion they may propel the vehicle either over land or through the water. A motor is provided inside the vehicle which is connected to drive the treads. It has been found with such a vehicle, if the motor is connected to drive the treads at such speeds that the power of the motor is effectively utilized when the vehicle is being driven over land, for example, that with such a connection between motor and treads the power of the motor is not effectively utilized when the vehicle is being driven through the water. This is due to the fact that the treads slip much less with respect to the land than they do with respect to water. It is of course also true that if transmission mechanism is provided in the power train between the motor and treads for providing suitable speed ratios for driving the vehicle over land, these speed ratios are unsuitable for driving the vehicle through the water. Conversely, it is true that if the drive between the motor and treads is such that the power of the motor is effectively utilized in driving the vehicle through the water, such drive is unsuitable for driving the vehicle over land.

One of the objects of my invention is to provide in a vehicle of this type, means in the power train of the vehicle whereby the power of the motor may be effectively utilized when the vehicle is being driven from either of the reaction media. More particularly, it is an object of my invention to provide in the power train between the motor and the propelling means for the vehicle a transmission, which may be termed an auxiliary transmission, for suitably increasing the speed of the propelling means with respect to the motor when the vehicle is being driven with respect to the reaction medium which allows the greater slippage of the propelling means. It is contemplated that such transmission mechanism shall be of such construction as to provide low and high speed ratios for both forward and reverse propulsion of the vehicle. Such transmission mechanism may be placed in tandem with other transmission mechanism, with the latter preferably being provided in order that there may be a suitable number of speed ratios between the motor and propelling means for use with either of the reaction media.

It is contemplated that a reversing mechanism may be placed in the power train of the vehicle between the auxiliary transmission and the motor, and it is an object of my invention to provide means interconnecting the controls of the transmission and the reversing mechanism whereby when the reversing mechanism is set in reverse the transmission is set to transmit power in a reverse direction and when the reversing mechanism is set for forward speed, the transmission is set to transmit power in a forward direction.

In its preferred form, my invention comprises a vehicle which is capable of floating and is provided with movable treads on each side thereof with the treads being so constructed that when moved they may propel the vehicle either over the land or through the water. A motor is provided in the vehicle connected to drive the treads and transmission means is provided for driving either of the treads at different speeds with respect to the other. A reversing unit is provided between the transmission mechanism and the motor, and the auxiliary transmission is provided between the reversing mechanism and the first mentioned transmission mechanism. Both the reversing unit and the auxiliary transmission are provided with controls, and a link is provided between the controls whereby when the reversing unit is set for either forward or reverse drive, the auxiliary transmission is set for the same drive.

In its preferred form the auxiliary transmission comprises driving and driven shafts, a pair of one-way clutches each adapted to drive the driven shaft, one of the clutches being adapted to drive in one direction and the other clutch being adapted to drive in the opposite direction, the driving shaft being longitudinally movable and connectible on such movement to either of the one-way clutches, epicyclic gearing comprising a sun gear, a ring gear and a planet gear in mesh with the two gears, a planet gear carrier connected with the driving shaft, the ring gear being connected with the driven shaft, and a brake for holding stationary the sun gear for an overdrive ratio.

The invention consists of the novel constructions, arrangements and devices to be hereinafter described and claimed for carrying out the above stated objects and such other objects as will appear from the following description of a certain preferred embodiment illustrated in the accompanying drawings wherein:

Fig. 1 is a side view of an automotive amphibian vehicle embodying the principles of my invention;

Fig. 2 is a plan view of the vehicle on an enlarged scale, with certain portions of the vehicle being broken away for the illustration of certain internal parts of the vehicle;

Fig. 3 is a side view on a greater enlarged scale of the reversing unit and the auxiliary transmission connected in the power train between the motor and treads of the vehicle;

Fig. 4 is a longitudinal sectional view on a still greater enlarged scale of the auxiliary transmission; and Figs. 5, 6 and 7 are sectional views taken on lines 5—5; 6—6; and 7—7, respectively, of Fig. 4.

In the drawings, similar numerals of reference refer to similar parts throughout the several views.

Referring to the drawings, the amphibian vehicle illustrated comprises a body 10 which is water tight and is capable of floating. A pair of sprocket members 11 and 12 are rotatably disposed on each side of the vehicle exteriorly thereof, and an articulated tread member 13 passes over and meshes with each pair of sprocket members. An upper race 14 and a lower race 15 are provided for supporting each tread member 13 (the races on one side of the vehicle only being shown in the drawings) such that the tread members may move freely around the races. Each of the tread members 13 has fastened thereto a plurality of tread shoes 16, with each of the shoes comprising a base portion 16a which extends substantially parallel with the line of motion of the tread member and a blade portion 16b which extends substantially perpendicular to the base portion. The illustrated vehicle is so constructed that when it is in the water, those portions of the tread members supported by the lower races 15 are submerged while those portions of the tread members supported by the upper races 14 are above the surface of the water. When the tread members 13 move in one direction or the other, with corresponding rotation of the sprocket members 11 and 12, the blade portions 16b of the tread shoes on those portions of the tread members supported by the lower races 15 react on the water and tend to move the vehicle. When the vehicle is on land, the blades 16b of the tread shoes on those portions of the tread members supported by the lower races 15 are in contact with the earth, and the base portions 16a of these shoes may also contact the earth depending on its softness, and if the treads 13 move, with corresponding movement of the sprocket members 11 and 12, the vehicle is moved in one direction or the other depending on the direction of movement of the tread members. It is apparent from the above that when the vehicle is in the water, the water constitutes a reaction medium against which the shoes act to propel the vehicle, and when the vehicle is on land, the earth constitutes a reaction medium against which the shoes act to propel the vehicle. When the vehicle is being propelled on land, there is in general little slippage of the shoes on the earth; however, when the vehicle is being propelled in the water, there is a substantial slippage or relative movement between the shoes and the surrounding water. For this reason the tread members 13 and the shoes 16 must be moved at a greater speed when the vehicle is being propelled through the water than when it is being propelled on land for effective utilization of the power of the motor, and means for accomplishing this result will hereinafter be described.

The sprocket members 11 are mounted on the vehicle body 10 by any suitable means such that the sprocket members may rotate independently of each other. The sprocket members 12 are power driven and operate to drive the tread members 13 and shoes 16 attached thereto for propelling the vehicle. The means for driving the sprocket members 12 includes a motor 17 suitably mounted inside the vehicle. The motor 17 may be of any suitable type such as a gasoline engine, and it may be of any suitable construction. The motor 17 is connected to drive a reversing mechanism 18 which is provided with a control lever 19 (see Fig. 3). The reversing mechanism may be of any suitable construction, and the mechanism is so arranged that when the control lever 19 is in its position as shown in full lines in Fig. 3, the output shaft (not shown) of the reversing unit rotates in one direction and when the control lever 19 is in its dotted line position as shown in Fig. 3, the output shaft of the reversing unit rotates in the opposite direction. The reversing mechanism is connected with an auxiliary transmission 20, which will hereinafter be described in greater detail, and the transmission 20 in turn is connected with a universal joint 21 of any suitable construction. The universal joint 21 is connected with a bevel gear unit 22 of any suitable construction, and the bevel gear unit is connected to drive a pair of transmissions 23, one of the transmissions being positioned on each side of the unit 22. The transmissions 23 are of any suitable construction to provide neutral and two or more speed ratios, and the transmissions are independently controlled by any suitable means (not shown). Each of the transmissions is connected to a brake 24 of any suitable construction which may be applied when the transmission connected therewith is in neutral. Each of the brakes 24 is connected with a gearing unit 25 which in turn is connected with one of the sprocket members 12. The units 18, 20, 21, 22, 23, 24 and 25 form a power train between the motor 17 and the sprocket members 12 whereby the latter are driven and they in turn drive the tread members 13. Since the transmissions 23 and the brakes 24 on either side of the bevel gear unit 22 are independently controlled, it will be apparent that the sprocket members 12 on either side of the vehicle and the respective tread members 13 driven thereby may be driven at different speeds, or one of the sprocket members 12 and its tread member may be held stationary while the other sprocket member and its tread member are driven, for purposes hereinafter to be described.

Referring now particularly to Figs. 4 to 7 of the drawings, a more detailed description of the auxiliary transmission 20 will be given. The transmission comprises a housing 26 in which is journaled a driving shaft 27 by means of a bearing 28 and a driven shaft 29 by means of bearings 30 and 31. An internally splined sleeve-like member 32 is fastened to the driving shaft 27, and a shaft 33, which may also be termed a driving shaft and which fits over shaft 27 and is slidable longitudinally with respect thereto, is provided with a splined portion 34 which fits in the splined member 32. At its other end the shaft 33 is piloted in the shaft 29 and is thus supported. The shaft 33 is provided with a grooved collar 35 which is fixed on the shaft against longitudinal movement relative thereto for purposes hereinafter to be described.

The shaft 29 is formed on an end thereof with an internal cylindrical surface 36. A ring-like member 37, a second ring-like member 38 and a spacing member 39 between the members 37 and 38 are provided in the cylindrical portion 36 of the shaft. The member 37 is provided with teeth 40 on its inner surface and is provided with cammed surfaces 41 (one being shown in the drawings) on its outer surface (see Fig. 7). A roller 42 is disposed between each of the cammed surfaces and the cylindrical surface 36, and a plunger 43 is provided for each of the rollers for forcing it up the respective cammed surface 41. Each plunger 43 is slidably mounted in a member 44 carried by the ring member 37, and a spring 45 is provided for pressing the plunger against the adjacent roller. The surfaces 36 and 41 and the rollers 42 together form a one-way clutch 46 by means of which the shaft 29 may be rotated in a clockwise direction as seen in Fig. 7 when the ring member 37 is rotated in such direction. The one-way clutch 46 also functions to permit the shaft 29 to rotate at a faster speed in a clockwise direction than the ring member 37.

The ring member 38 is provided on its inner surface with teeth 47 which are similar to teeth 40, and it is provided on its outer surface with cammed surfaces 48 (one being shown in the drawings). The surfaces 48 are similar to the cammed surfaces 41 with the exception that the surfaces 48 are disposed oppositely from the surfaces 41 as is apparent from a comparison of Figs. 6 and 7. Rollers 49, plungers 50, plunger supports 51, and springs 52, are provided in the same relation to each other as the corresponding parts of the one-way clutch 46 with the exception that the parts are reversed as is apparent. The surfaces 36 and 48 and the rollers 49 form a one-way clutch 53 which functions similarly to the one-way clutch 46 except that the shaft 29 is rotated in a counterclockwise direction instead of a clockwise direction, as seen in Figs. 6 and 7, when the ring member 38 is rotated in such direction.

The shaft 33 is provided with a plurality of teeth 54 which are adapted to intermesh with either the teeth 40 of the member 37 or the teeth 47 of the member 38 depending on the longitudinal position of the shaft 33. The shaft 33 may be thereby connected either with the one-way clutch 46 or the one-way clutch 53.

The shaft 33 is provided adjacent its teeth 54 with a splined portion on which is slidably and non-rotatably mounted a planet gear carrier 55. The carrier 55 is provided with a plurality of stub shafts 56 on each of which is rotatably mounted a planet gear 57. A ring gear 58 is provided in mesh with the planet gears 57, and the ring gear is connected by any suitable means with the shaft 29. A sun gear 59 is provided in mesh with the planet gears 57 and is rotatably mounted on the shaft 33. A brake drum 60 is fixed by any suitable means to the sun gear 59, and a brake 61 is provided on the drum 60. The ring gear 58, the sun gear 59, the planet gears 57, and the planet carrier 55 form epicyclic gearing, and such gearing functions, as is well known, with the sun gear held stationary and the carrier being driven, to drive the ring gear at a speed greater than that of the carrier.

There are many different types of well known brake applying means which might be used with the brake 61; however, the brake applying means which will now be described has been found to function very satisfactorily with the transmission illustrated. The brake applying means comprises a link 62 (see Fig. 5) which is pivotally connected with the brake band 61 and with a lever 63. A link 64 is pivotally connected at one end with the housing 26 and at the other end with the lever 63. A link 65 is provided pivotally connected with the lever 63 at one end of the latter, and the lever 63 at its other end is connected by any suitable means with one end of the brake 61. The link 65 may be moved to the left as seen in the figure by means of a piston 66 and may be moved to the right as seen in the figure by a spring 67. The piston 66 is disposed in a cylinder 68 which is connected by a pipe 69 with any suitable source of fluid pressure (not shown). When fluid pressure is applied to the piston 66 through the pipe 69, the piston moves to the left as seen in the figure moving the link 65 and the upper end of the lever 63 in the same direction. Such movement of the lever 63 moves the link 62 and the end of the brake band 61 connected therewith to the left as seen in the figure and moves the other end of the brake band to the right with the link 64 acting as the fulcrum for the lever 63. Such movement of the piston 66 thus tightens the brake band 61. When the fluid pressure against the piston 66 is released, the spring 67 acts to move the parts in the opposite directions and release the brake band 61.

The driving shaft 33 may be moved longitudinally in either direction in order to control the transmission 20 by means of a lever 70 which is swingably mounted with respect to the housing 26 and is connected with a fork 71 whereby the fork moves with the lever. The fork 71 embraces the collar 35 and has portions 72 in the groove of the collar whereby the lever 70 on movement thereof moves the collar and thereby the shaft 33.

A link 73 is provided for connecting the control lever 19 of the reversing unit and the control lever 70 of the transmission mechanism 20. When the control lever 70 is in its position as shown in full lines in Fig. 3, the teeth 54 on the shaft 33 are in mesh with the teeth 40 on the ring member 37, and the shaft 29 may be driven in a clockwise direction, as seen in Figs. 6 and 7, when the shafts 27 and 33 are rotated in such direction. The reversing unit 18 and its control lever 19 are so arranged that when the lever is in its full line position, as seen in Fig. 3, the reversing unit acts to rotate the shafts 27 and 33 in the same direction as the shaft 29 rotates when the drive is through the one-way clutch 46. When the levers 19 and 70 are in their full line positions, as seen in Fig. 3, the drive is thus complete from the motor to the driven shaft 29 of the transmission mechanism 20, and the shaft 29 is rotated in a clockwise direction as seen in Figs. 6 and 7. When the control levers 19 and 70 are in their dotted line positions as seen in Fig. 3, the reversing unit operates to drive the shafts 29 and 33 in a reverse direction and the drive through the transmission is through the one-way clutch 53. With the levers in these positions also the drive is complete from the motor to the shaft 29, but the shaft is rotated in a counterclockwise direction as seen in Figs. 6 and 7. The link 73 operates to move the levers 19 and 70 simultaneously such that the reversing unit will always drive in a direction to transmit power through the one of the one-way clutches 46 or 53 which may be connected between the shafts 33 and 29. Operating means of any suitable type, such as a rod 74, may be provided for operating the control levers 19 and 70.

The transmission 20 operates to provide a direct drive between driving shafts 27 and 33 and driven shaft 29 for either direction of rotation of the shafts, and the transmission further provides an overdrive ratio for either direction of rotation of the shafts whereby the driven shaft 29 rotates at a greater speed than the driving shafts 27 and 33. When the shaft 33 is in its position as shown in Fig. 4 with the teeth 54 in mesh with the teeth 40 and if the driving shafts 27 and 33 and thereby the ring member 37 are rotated in a clockwise direction as seen in Figs. 6 and 7, the driven shaft 29 will be driven by means of the one-way clutch 46 in direct drive at the same speed and in the same direction as the driving shafts and ring member. When the shaft 33 is moved longitudinally from its position as shown in Fig. 4 such that the teeth 54 mesh with the teeth 47 and if the shafts 27 and 33 and ring member 38 are rotated in the opposite direction, counterclockwise as seen in Figs. 6 and 7, the driven shaft 29 will be rotated in direct drive in this direction by means of the one-way clutch 53.

When the driven shaft 29 is rotated in one direction or the other by means of either the one-way clutch 46 or the one-way clutch 53, and it is desired to increase the speed of rotation of the shaft 29, the brake band 61 is brought into engagement with the brake drum 60 by allowing fluid under pressure to flow through the pipe 69 to move the plunger 66 to the left as seen in Fig. 5. The brake band 61 operates to hold the drum 60 and thereby the sun gear 59 stationary, and since the planet carrier 55 is connected to rotate with the shaft 33, the ring gear 58 and thereby the driven shaft 29 are rotated at a speed greater than that of the shafts 27 and 33 and in the same direction as these shafts. One of the one-way clutches 46 or 53, depending with which ring member 37 or 38 the shaft 33 is connected by its teeth 54, will overrun when the shaft 29 is driven at the greater speed.

The link 73 connecting the control levers 19 and 70 operates to assure that the power train including the reversing unit 18 and transmission 20 is complete for either direction of rotation at which the reversing unit may be set. When the vehicle operator wishes to change the direction of movement of the vehicle, he simply moves the control levers 19 and 70 from one set of operative positions to the other. When the brake 61 is disengaged this operation changes the direction of drive by the reversing unit 18 and changes the one-way clutch in the transmission 20 through which the shaft 29 is driven. When the brake 61 is engaged, this operation simply changes the direction of drive by the reversing unit 18, and the transmission 20 automatically operates to drive the shaft 29 at a higher speed in the reversed direction.

When the brake band 61 is disengaged, and the teeth 54 of the shaft 33 are in mesh either with the teeth 40 or the teeth 47, the vehicle may be driven over land, and the gearing in the units 18, 22 and 25 is such that with all ratios provided by transmissions 23, the power of the motor 17 may be effectively utilized and in general the load on the motor is not sufficient to stall it. The speed ratios of the transmissions 23 provide for the changes in the nature of the terrain over which the vehicle is driven, and the tread members 13 may be driven with more or less power as needed. The transmissions 23 on either side of the bevel gear unit 22 may have their speed ratios changed independently of each other, and the vehicle may thus be gradually and constantly turned as may be desired by driving one of the tread members 13 at a slower speed than the other. By means of the brakes 24, either of the tread members 13 may be stopped while the other tread member is being driven, and the vehicle may thus be controlled to turn more sharply than if the transmissions were simply shifted to different speed ratios.

When the vehicle is in the water, the speed ratios provided between sprocket members 12 and the motor are not sufficiently high whereby the power of the motor is effectively utilized in driving the vehicle, due to the slippage between the shoes 16 and the surrounding water. The brake band 61 is then engaged to bring the transmission 20 into effect for driving the sprockets 12 and thereby the tread members 13 at greater speed, and under these conditions the power of the motor is more effectively utilized. Due to the fact that the transmission 20 is connected in tandem or in series with each of the transmissions 23, either of the tread members 13 may be driven at a slower speed than the other tread member, and the vehicle may thus be made to turn constantly and gradually in the water as well as on land. If a sharper turn is desired when in the water, one of the brakes 24 may be engaged when the adjacent transmission 23 is in neutral similarly as for operation of the vehicle on land.

The interconnection I provide between the reversing unit and the auxiliary transmission effectively assures a complete power train through the two units regardless of the direction for which the reversing unit is set to drive the vehicle. The auxiliary transmission unit in the power train between the tread members and motor assures that the power of the motor is effectively utilized when the vehicle is being propelled through the water as well as over land, and the speed of one of the tread members may be reduced with respect to the speed of the other for steering purposes when the vehicle is being propelled through the water as well as over land.

I wish it to be understood that my invention is not to be limited to the specific constructions and arrangements shown and described, except so far as the claims may be so limited as it will be apparent to those skilled in the art that changes may be made without departing from the principles of my invention.

I claim:

1. In an amphibian vehicle, the combination of movable means on the exterior of the vehicle for propelling the vehicle on land or through the water, a motor in said vehicle and connected to drive said propelling means, transmission means between said motor and propelling means for driving the propelling means at a plurality of speed ratios with respect to the motor, auxiliary transmission means connected in tandem with said first named transmission means and providing a low and a high speed ratio, and a reversing unit connected in series with said transmission means for selectively reversing the direction of rotation of said propelling means for all speed ratios of both of said transmission means, said high speed ratio driving the propelling means at higher speeds when the vehicle is being propelled through water for effectively utilizing the power of the motor.

2. In an amphibian vehicle, the combination of a pair of movable treads on opposite sides of the vehicle for propelling the vehicle on land or through the water, a motor in said vehicle and connected to drive said treads, a transmission between said motor and one of said treads for driving the tread at a plurality of speed ratios with respect to the motor, another transmission between said motor and the other of said treads for driving the last named tread at a plurality of speed ratios with respect to the motor, an auxiliary transmission connected to drive both of said above named transmissions and providing a low and a high speed ratio, and a reversing unit connected in series with said transmissions for selectively reversing the direction of rotation of said propelling means for all speed ratios of both of said transmissions, said auxiliary transmission in high speed ratio driving the treads at higher speeds for effectively utilizing the power of the motor when the vehicle is being propelled through water.

3. In an automotive vehicle, the combination of means for propelling the vehicle, a motor in said vehicle and connected by a power train with said propelling means, a reversing mechanism in said power train and having a control, a transmission in said power train between said reversing mechanism and said propelling means, said transmission providing a low ratio and a high ratio for both forward and reverse drive of said reversing mechanism and being provided with a control for conditioning the transmission to provide both said ratios under either forward drive of the reversing mechanism in one position of the control or reverse drive in another position of the control, and means interconnecting the controls of said reversing mechanism and said transmission whereby the transmission is conditioned to transmit power in the same direction as the reversing mechanism delivers power.

4. In an automotive vehicle, the combination of means for propelling the vehicle, a motor in said vehicle and connected by a power train with said propelling means, a reversing mechanism in said power train and having a control, a transmission in said power train between said reversing mechanism and said propelling means and comprising a pair of one-way clutches, one of said clutches being adapted to transmit power in one direction for driving the propelling means thereby from the motor and the other of said clutches being adapted to transmit power in the opposite direction for driving the propelling means thereby from the motor, and a transmission control for alternatively connecting either of said clutches in said power train, and simultaneously disconnecting the other of the clutches from the power train said controls for said reversing mechanism and said transmission being interconnected whereby when one of said clutches is connected in the power train for a drive in one direction the reversing mechanism is controlled to drive in the same direction.

5. In an automotive vehicle, the combination of means for propelling the vehicle, a motor in said vehicle and connected by a power train with said propelling means, a reversing mechanism in said power train and having a control, a transmission in said power train between said reversing mechanism and said propelling means and comprising epicyclic gearing and a pair of one-way clutches, one of said clutches being adapted to transmit power in one direction and the other of said clutches being adapted to transmit power at the same ratio as the first clutch and in the opposite direction, and a transmission control for alternatively connecting either of said clutches in said power train, said epicyclic gearing being connectible in said power train to provide a higher speed ratio for both forward and reverse drive, said controls for said reversing mechanism and said transmission being interconnected whereby when one of said clutches is connected in the power train for a drive in one direction the reversing mechanism is controlled to drive in the same direction.

6. In an amphibian vehicle, the combination of movable means on the exterior of the vehicle for propelling the vehicle on land or through the water, a motor in said vehicle and connected by a power train with said propelling means, a reversing mechanism in said power train and having a control, a transmission in said power train between said reversing mechanism and said propelling means, said transmission providing for both forward and reverse drive of said reversing mechanism a low ratio whereby the power of the motor may be effectively utilized when the vehicle is being propelled over land and also a high ratio whereby the power of the motor may be effectively utilized when the vehicle is being propelled through the water, said transmission being provided with a control for conditioning the transmission to provide both said ratios for either forward drive of the reversing mechanism in one position of the control or for reverse drive in another position of the control, and means interconnecting the controls of said reversing mechanism and said transmission whereby the transmission is conditioned to transmit power in the same direction as the revering mechanism delivers power.

BENJAMIN A. SWENNES.